United States Patent
Rodek et al.

(10) Patent No.: US 6,360,653 B1
(45) Date of Patent: Mar. 26, 2002

(54) HARDENED GLASS OR GLASS-CERAMIC COOKING VESSEL FORMED AS A WOK, AND METHOD OF MAKING SAME

(75) Inventors: Erich Rodek; Helga Goetz, both of Mainz; Stefan Hubert, Bubenheim; Evelin Weiss, Mainz; Patrik Schober, Mainz-Ebersheim; Horst Schillert, Gruenenplan, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/504,202

(22) Filed: Feb. 15, 2000

(30) Foreign Application Priority Data

Feb. 17, 1999 (DE) .......................................... 199 06 520

(51) Int. Cl.⁷ ............................. A47J 36/04; A47J 37/06
(52) U.S. Cl. ..................... 99/339; 99/422; 220/573.1; 126/390.1
(58) Field of Search ................ 99/422, 339; 126/390.1, 126/373.1; 220/573.1, 574, 573.2

(56) References Cited

U.S. PATENT DOCUMENTS

| | | |
|---|---|---|
| 2,015,219 A | 9/1935 | Gray |
| 3,607,186 A | 9/1971 | Bognar ........................ 65/104 |
| 3,817,732 A | 6/1974 | Pei |
| 3,837,895 A * | 9/1974 | Pryor et al. |
| 3,891,421 A | 6/1975 | Levin ........................... 65/107 |
| 4,210,433 A | 7/1980 | Andrysick ..................... 65/66 |
| 4,361,257 A * | 11/1982 | Stone, Jr. ................... 99/275 X |
| 4,491,235 A * | 1/1985 | Fournier et al. ............ 126/390 |
| 4,793,245 A * | 12/1988 | Kimura ........................ 99/292 |
| 4,848,541 A * | 7/1989 | Paliotta et al. ........... 206/45.14 |
| 4,892,213 A * | 1/1990 | Mason, Jr. ................... 126/390 |
| 5,957,323 A * | 9/1999 | Terracciano et al. ........ 220/574 |

FOREIGN PATENT DOCUMENTS

| | | |
|---|---|---|
| DE | 10 55 766 | 4/1959 |
| DE | 298 20 731 U1 | 3/1999 |
| EP | 0 173 418 A | 3/1986 |
| FR | 2 638 957 A | 5/1990 |

OTHER PUBLICATIONS

Patent Abstract of Japan vol. 014, No. 480 (C–0771) & JP 02 198526 A, Aug. 7, 1990.

* cited by examiner

Primary Examiner—Reginald L. Alexander
(74) Attorney, Agent, or Firm—Michael J. Striker

(57) ABSTRACT

The wok is made from hardened glass or glass-ceramic material so that it has a cooking surface that is easier to clean than prior art metal woks. Furthermore when it is heated a better temperature distribution for cooking is produced and it can be universally heated, either by a radiantly heated body or an atmospheric gas burner. The method of making the wok starts with a glass blank or piece of borosilicate glass, which is heated until it softens and then is shaped or formed into the shape of the wok, optionally ceramicized and cooled.

5 Claims, 1 Drawing Sheet

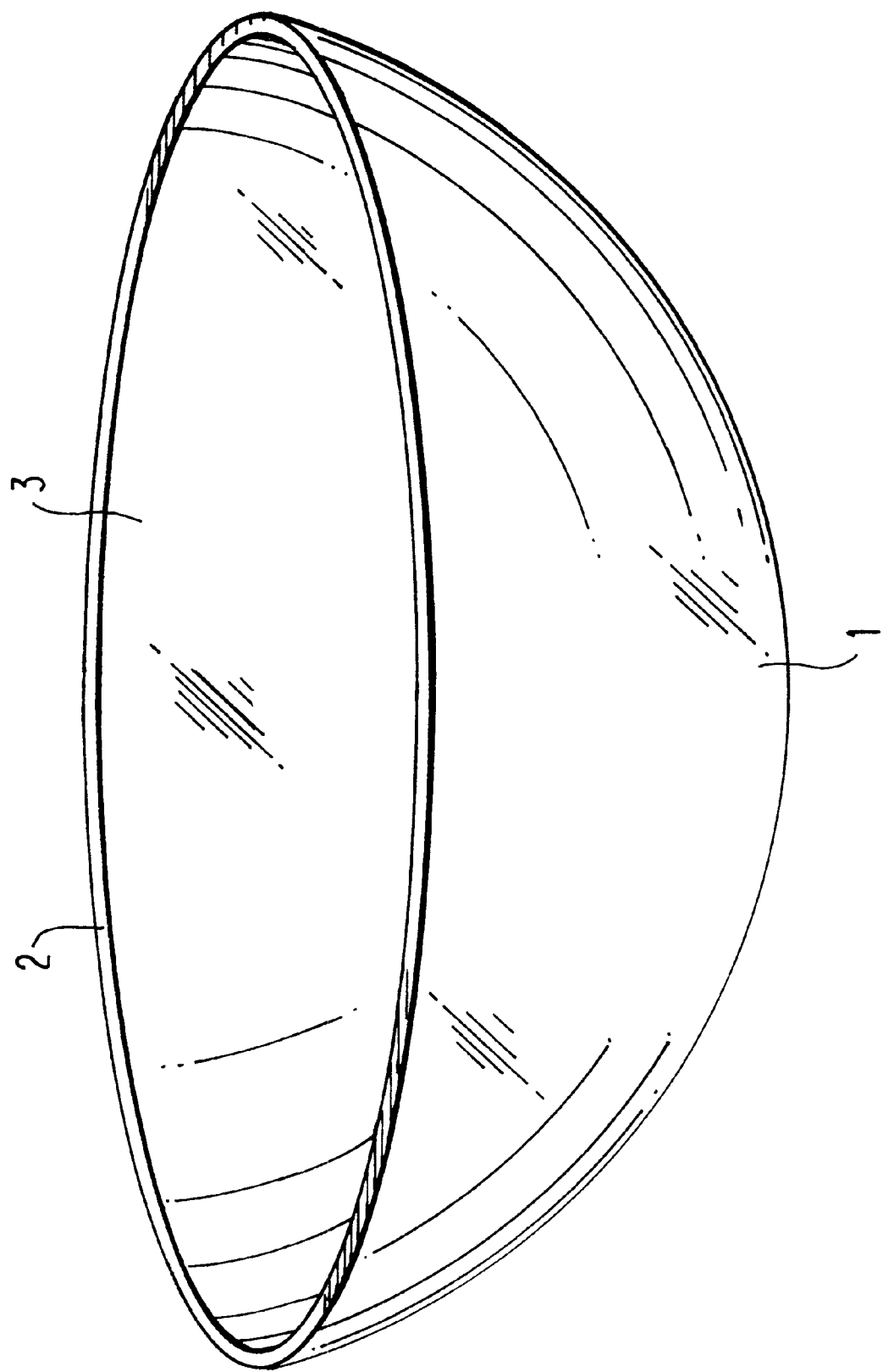

HARDENED GLASS OR GLASS-CERAMIC COOKING VESSEL FORMED AS A WOK, AND METHOD OF MAKING SAME

BACKGROUND OF THE INVENTION

1. Field of the Invention

The present invention relates to a cooking vessel or utensil and, more particularly, to a wok for direct heating of food to prepare it. The cooking vessel of the present invention is provided with spherically or non-spherically curved surfaces and is designated as a wok because of its far-eastern origin. The present invention also relates to methods of making the cooking vessel.

2. Prior Art

Foods are preferably prepared in metallic or cast iron woks, which are heated from underneath by means of a gas flame or a wood fire, in a special manner in Asiatic regions. Meat, vegetables, rice are cooked together or separately first in the center of the wok, where it is at its hottest, and then pushed to the cooler edge. Everything is mixed prior to being served.

This typical wok cannot be used on a planar, especially electrically heated, cooking surface because of its spherical bottom. There are also "altered" woks made from cast iron, stainless steel or aluminum, which have a flattened bottom so that they can be used also on planar cooking surfaces. Since these altered woks also have an interior plane surface, the same cooking properties do not result, as in a typically spherical wok.

Also electrically heated table woks are known, in which a metallic dish is heated from below with a heated coil and is built into and fixed in a housing.

Woks are known from EP 0 629 820 A2, which are heated inductively. In these devices a cast ion, typically spherically formed wok, sits in a suitably formed porcelain or glass-ceramic dish, also designated a vessel, which for its part for example, is embedded in a working panel of a cooking range. Because of the residual heat in this heated metal wok, the porcelain dish may be thermally stressed too strongly, so that it can break or crack.

Furthermore all these commercially available woks with cast spherical or non-spherical metallic half shell vessels have the fundamental disadvantage that the materials to be finished frequently stick to it because of the large pore size on the interior surface of the wok, which frequently makes cleaning difficult. DE 298 20 731 U1 thus suggests providing the interior surface of the wok with a corrosion-resistant coating, which consists of hardened chromium with embedded PTFE. The application of this coating is very expensive.

SUMMARY OF THE INVENTION

It is an object of the present invention to provide a cooking vessel of the above-described kind, formed as a wok—cooking vessel for directly heating and preparing food, which is formed so that is universally heatable and requires no expensive interior coating.

According to the invention the wok or cooking vessel is made from hardened glass or glass-ceramic material with an appropriately small linear thermal expansion coefficient.

The method of making this sort of wok from hardened glass comprises the following steps:

a) preparing a pre-made hardened glass blank;

b) heating the hardened glass blank to its softening temperature immediately prior to the shaping or forming process;

c) shaping or forming the plasticized hardened glass blank to form the wok or cooking vessel, preferably by deep drawing, vacuum techniques or weight shaping techniques; and d) cooling and tempering the wok or cooking vessel formed by the shaping or forming;

OR a) preparing a piece of hardened glass;

b) shaping or forming the hardened glass piece by pressing, blowing or casting to make the wok or cooking vessel, and c) cooling and temperature the wok or cooking vessel formed by the shaping or forming.

The method of making this sort of wok from glass-ceramics comprises the following steps:

a) preparing a moldable or formable, non-ceramic glass blank;

b) heating the hardened glass blank to its softening temperature immediately prior to the shaping or forming process;

c) shaping or forming the glass blank to form the wok or cooking vessel, preferably by deep drawing, vacuum techniques or weight shaping techniques;

d) ceramicizing the wok or cooking vessel after the shaping or forming; and e) cooling the wok or cooking vessel after the ceramicizing.

The cover for the above-described cooking vessel, made according to the above-described methods, preferably is formed so that it is a curved or a substantially flat molded body made of hardened glass or glass-ceramic with a suitably small linear expansion coefficient.

BRIEF DESCRIPTION OF THE DRAWING

The objects, features and advantages of the invention will now be illustrated in more detail with the aid of the following description of the preferred embodiments, with reference to the sole FIGURE, which is a schematic perspective view of the wok or cooking vessel according to the invention.

DESCRIPTION OF THE PREFERRED EMBODIMENT

The wok shown in the sole FIGURE has a hemispherical dish 1 having a wall thickness 2 made of hardened glass or glass ceramic with a suitable small thermal expansion coefficient. According to the Standard DIN 1259, Part 1, the hardened glass is a chemically resistant and thermally resistant apparatus glass with a high softening temperature and a linear thermal expansion coefficient $\alpha < 6 \times 10^{-6}$/K. The hardened glass is typically a borosilicate glass.

According to this standard "glass-ceramic" means an inorganic fusion product with added nuclei forming agents, which solidifies on cooling to form a glass, however crystallizes out into different phases by a subsequently controlled thermal treatment. This type of glass-ceramic product almost without exception is characterized by a minimum linear thermal expansion coefficient.

The wall thickness 2 of the hemispherical dish 1 forming the wok is typically in a range of from 4 to 6 mm.

The glass/glass-ceramic dish 1 forming the wok can be built into a cooking range in a conventional manner, preferably it can be mounted in a suitable opening in a glass/glass-ceramic cooking surface, which typically has several cooking zones, either radiantly heated cooking zones in the cooking surface or glass burner cooking areas in the case of atmospheric gas burners. However it can also be mounted in a table holder.

The wok according to the invention made from hardened glass or glass-ceramic material can be heated both with an open gas flame, but is preferably heated by means of a radiantly heated body. With this type of heating the food is prepared directly typically in the interior 3 of the wok.

A larger temperature difference arises between the heated and unheated regions because of the smaller thermal transverse conduction of glass and glass-ceramic material in comparison to metal. This effect can be used for the typical cooking taking place in the wok according to the invention in comparison to conventional metal woks. The cooler zones, in which the food prepared first is pushed, are considerably cooler. Furthermore the cooked material does not adhere to the wok because of the smooth pore-free surfaces, as is the case with all woks currently on the market, whereby the finished surfaces in the interior 3 of the hemispherical shell 1 forming the wok are very easy to clean.

The hardened glass or glass-ceramic materials can be thermally prestressed sufficiently for use in the wok.

The making of the wok according to the invention occurs, as already mentioned, when the glass/glass-ceramic, which has a sufficiently small thermal expansion coefficient, is shaped or formed into a wok-like dish by, for example, deep-drawing, vacuum techniques, weight shaping or gravity forming techniques, pressing or casting.

Immediately prior to the shaping or forming process the glass is heated up to the glass softening temperature. With the glass-ceramic as raw material the ceramicizing occurs after the shaping process.

A cover that fits the wok can also be made by the same method as the wok.

The spherically shaped wok shown in the figure is only one example or embodiment. The wok can also have various non-spherical shapes. For example the wok can also have a somewhat more pointed shape in the center than at a spherical surface.

The disclosure in German Patent Application 199 06 520.9-16 of Feb. 17, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a hardened glass or glass-ceramic cooking vessel formed as a wok, and method of making same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A wok direct heating of food to prepare said food, wherein said wok consists of glass-ceramic material having a linear thermal expansion coefficient that is less than $6.*10^{-6}/K$.

2. The wok as defined in claim 1, having a wall thickness (2) in a range of from 3 to 7 mm.

3. A wok for direct heating of food to prepare said food, wherein said wok consists of hardened glass having a linear thermal expansion coefficient that is less than $6.*10^{-6}/K$.

4. The wok as defined in claim 3, having a wall thickness (2) in a range of from 3 to 7 mm.

5. The wok as defined in claim 3, wherein said hardened glass is a borosilicate glass.

* * * * *